(12) United States Patent
Damgaard et al.

(10) Patent No.: US 7,600,971 B2
(45) Date of Patent: Oct. 13, 2009

(54) METHODS OF MOVING THE ROTATING MEANS OF A WIND TURBINE DURING TRANSPORTATION OR STAND STILL, METHOD OF CONTROLLING THE MOVING OF THE ROTATING MEANS, NACELLE, AUXILIARY DEVICE, CONTROL AND MONITORING SYSTEM AND USE HEREOF

(75) Inventors: Søren Damgaard, Ringkøbing (DK); Arne Haarh, Ringkøbing (DK); Nils Bjørn Jensen, Vejen (DK)

(73) Assignee: Vestas Wind Systems A/S (DK)

( * ) Notice: Subject to any disclaimer, the term of this patent is extended or adjusted under 35 U.S.C. 154(b) by 524 days.

(21) Appl. No.: 10/550,442

(22) PCT Filed: Mar. 21, 2003

(86) PCT No.: PCT/DK03/00196

§ 371 (c)(1),
(2), (4) Date: May 19, 2006

(87) PCT Pub. No.: WO2004/083630

PCT Pub. Date: Sep. 30, 2004

(65) Prior Publication Data

US 2007/0036655 A1    Feb. 15, 2007

(51) Int. Cl.
*F03D 9/00*    (2006.01)
*F04D 29/00*    (2006.01)

(52) U.S. Cl. .................................. 416/1; 416/170 R

(58) Field of Classification Search ............... 415/123, 415/124.1; 416/170 R
See application file for complete search history.

(56) References Cited

U.S. PATENT DOCUMENTS 2,335,692 A * 11/1943 Murray ..................... 414/346
2,725,241 A * 11/1955 Leonard, Jr. ................ 410/44

(Continued)

FOREIGN PATENT DOCUMENTS

DE    200 21 026    3/2001

(Continued)

OTHER PUBLICATIONS

International Search Report; PCT/DK03/00196; Sep. 19, 2003.

*Primary Examiner*—Edward Look
*Assistant Examiner*—Sean J Younger
(74) *Attorney, Agent, or Firm*—St. Onge Steward Johnston & Reens LLC

(57) ABSTRACT

The invention relates to methods of moving the rotating means of a wind turbine during transportation or stand still. The methods may comprise the steps of: securing at least one auxiliary device to a position and connecting said device to one or more shafts of the rotating means at the transportation or stand still. The auxiliary device being able to store, generate and/or convert energy during transportation, transferring energy continuously from said at least one auxiliary device to said one or more shafts of the rotating means during transportation or stand still, and moving said one or more shafts of the rotating means continuously or discontinuously from a position to another. The invention also relates to a nacelle for a wind turbine, an auxiliary device, a control system for controlling the moving of the rotating means of a wind turbine nacelle during transportation of the nacelle and use hereof.

18 Claims, 10 Drawing Sheets

U.S. PATENT DOCUMENTS 2,808,288 A * 10/1957 Benson .................... 410/68
5,947,665 A * 9/1999 Baur et al. ................ 410/44

FOREIGN PATENT DOCUMENTS

| EP | 1 336 755 | 8/2003 |
| GB | 2 201 200 | 8/1988 |
| WO | WO 03 031812 | 4/2003 |

* cited by examiner

METHODS OF MOVING THE ROTATING MEANS OF A WIND TURBINE DURING TRANSPORTATION OR STAND STILL, METHOD OF CONTROLLING THE MOVING OF THE ROTATING MEANS, NACELLE, AUXILIARY DEVICE, CONTROL AND MONITORING SYSTEM AND USE HEREOF

TECHNICAL FIELD OF THE INVENTION

The invention relates to methods of moving the rotating means of a wind turbine during transportation or stand still, a method of controlling the moving of the rotating means, a nacelle, an auxiliary device, a control and monitoring system and use of an auxiliary device.

DESCRIPTION OF THE RELATED ART

In recent years the size of wind turbines has increased significantly which has resulted in still larger, heavier and more complex wind turbine components. Especially, components of the nacelle together with the wind turbine rotor have increased both in size, weight and in complexity. In order to meet the increased size and weight of the nacelle components as well as the increased size of the rotor, the nacelle has also increased in size and weight.

The increased size and complexity of different components in the wind turbines, such as the nacelle and the wind turbine rotor, have resulted in production at large and specialized production plants. The plants are often positioned in a rather few central locations around the world and thus relaying on transporting many of the different components in wind turbines over long distances to the places of erection. The transportation of wind turbine components may primarily involve trains or ships. Further, the transportation may include large trucks and combinations of trains, ships and trucks.

The transportation of the nacelle of a wind turbine over long distances involves problems as the nacelle includes a number of components with rotating means. The components are especially the gear but also the one or more generators which all have shafts, rotating during normal use of the wind turbine in a number of bearings and engaging with toothed wheels of the gear. During the long transportation the protective oil films that separates the rotating means from the bearing and toothed wheels from each other may be ruptured or vanish due to vibrations and the weight of the shafts, resulting in damage to the shafts, the bearings or the toothed wheels. Especially continuous low frequency vibrations such as vibrations from a ship engine are harmful to the components in question.

The damage is often quite small in size e.g. less than $\frac{1}{1000}$ millimeter and thus not visible to the human eye but may result in a reduced lifespan for the components.

In order to avoid the problem, the rotating means may be equipped with transportation furnishings at the shaft ends. The furnishings allow the shafts to be held in a position in which the weight is not transferred to the bearings. The furnishings are however less useful in connection with the gear and especially the toothed wheels due to the structural nature of the gear.

Further, furnishings are difficult and time consuming to position correctly in a nacelle before the transportation starts.

An object of the invention is to establish methods and system for wind turbines without the above-mentioned disadvantage and especially without the rupturing or vanishing of the oil film in rotating means of a wind turbine such as gears and generators.

A further object of the invention is to establish control systems for monitoring and optimising the established methods and system for wind turbines.

BRIEF SUMMARY OF THE INVENTION

The invention relates to a method of moving the rotating means of a wind turbine during transportation, said method comprising the steps of:

securing at least one auxiliary device to a fixed position in relation to said rotating means, connecting said at least one auxiliary device to the rotating means at the transportation, said least one auxiliary device being able to store, generate and/or convert energy during transportation, transferring energy from said at least one auxiliary device to said one or more shafts of the rotating means during transportation, and moving said one or more shafts of the rotating means continuously or discontinuously from a position to another.

Hereby it is possible to protect the rotating means during longer periods of stand still before the erection of the wind turbine e.g. during transportation. It is possible to eliminate stand still marks on the rotating means of a wind turbine as the rupturing or vanishing of the oil film is avoided. In particular, microscopic stand still marks can be avoided on the toothed wheel of the gear and the generator bearings, and the potential lifetime of the rotating means are thus significantly improved.

The term "rotating means" is to be understood as means of a wind turbine which under normal use is part of the components in the nacelle such as the gear and the generator. The rotating means may, among the nacelle components, be gear and generator which comprise rotating shafts, bearings and toothed wheels.

In an aspect of the invention, said rotating means is included in a nacelle of a wind turbine or in a transportation frame construction.

It shall be emphasised that the transportation may be of the nacelle including the rotating means and the auxiliary device or the rotating means and the auxiliary device alone e.g. the transportation of a gear or a generator of a wind turbine and the auxiliary device in transportation frame construction. The construction may in a simple version be the necessary means for securing the gear or a generator to the platform of the transportation means and protecting the gear or a generator against the weather conditions e.g. a tarpaulin covering the gear and the generator. The version may further include means for ensuring that the auxiliary device and the rotating means are not entangled in the tarpaulin or the like in which the means may e.g. be brackets or rods. In more advanced versions the tarpaulin may be replaced with more solid wall structures.

In a further aspect of the invention, said auxiliary device is connected to one or more shafts such as the high-speed shaft at the gear and/or the generator. Hereby it is possible to change the position e.g. of the toothed wheels or bearings of gears or generators, and thus avoid the rupture or vanish of an oil film.

In a further aspect of the invention, the moving of said one or more shafts are turned at a very low turning speed such as less than one full turn per week e.g. between 1 and 20 degrees per day. The low turning speed ensures that the needed power for the turning is reduced significantly compared to the normal "high speed". The turning speed will be significantly enough to ensure that metal surfaces will not penetrate the oil film and touch each other.

In an even further aspect of the invention, the moving of said rotating means is discontinuous e.g. between 30 seconds and 20 minutes of movement every period such as 1 minute movement every 3 hours. Hereby it is possible to reduce the needed power for the turning to a minimum and thus ensure that the energy storage may be kept compact or last longer.

In another aspect of the invention, the moving of said one or more shafts of the rotating means is combined with oil lubrication at said rotating means. The use of oil lubrication during the turning or moving process further reduces the necessary turning speed as the oil film continuously is strengthened. Hereby a certain rupture or vanish of the oil film in rotating means can be accepted without the metal surfaces touching each other and thus stand still marks occur.

In a further aspect of the invention, said transportation is performed with transportation means such as trucks, trains or ships. The invention is especially relevant to transportations over a longer time period that normally introduces the possibility of dangerously long stand stills.

In a further aspect of the invention, said auxiliary device is connected to one or more energy generating systems of said transportation means such as the electric generators, pneumatic or hydraulic pumps. By using the energy generating systems of the transportation means, it is possible to ensure a reliable power supply to the auxiliary device. The energy generating systems may be prepared for the connection e.g. by establishing power outlets at the transportation platform for the rotating means.

Further, the invention relates to a method of moving the rotating means of a wind turbine during stand still, said method comprising the steps of:

at least one auxiliary device being secured to a fixed position in relation to said rotating means and connected to the rotating means, said at least one auxiliary device being able to store, generate and/or convert energy during stand still, transferring energy from said at least one auxiliary device to said one or more shafts of the rotating means during stand still, and moving said one or more shafts of the rotating means continuously or discontinuously from a position to another.

Hereby it is further possible to protect the rotating means during periods of stand still e.g. longer periods in storage facilities.

The invention also relates to a method of controlling the moving of the rotating means of a wind turbine during transportation or stand still, said method includes control and monitoring system including an algorithm, said system comprising inputs signal from one or more of sensors, controlling at least one auxiliary device with output signals of said control and monitoring system in order to move the rotating means of the wind turbine during transportation or stand still, wherein said output signal is derived from said input signals and/or time signals.

Hereby it is possible to protect the rotating means of the wind turbine from potential damage during transportation or stand still. The potential lifetime of the rotating means may thus be significantly improved, especially as the algorithm may use the input and/or time signals in order to create an output signal controlling said at least one auxiliary device in a preferred and advanced manner.

Even further, the invention relates to a nacelle for a wind turbine defining an enclosed space, said nacelle comprising rotating means such as gear and/or generators including one or more shafts, and at least one auxiliary device being secured to a fixed position in the nacelle with securing means and connected to said rotation means with connection means, wherein said auxiliary device moves the rotating means of the wind turbine nacelle during transportation or stand still of said wind turbine nacelle.

Hereby it is possible to protect the rotating means of the nacelle from potential damage during transportation or stand still. The potential lifetime of the rotating means may thus be significantly improved.

In an embodiment, said connection means is a belt arrangement including a belt, belt pulleys at said one or more shafts, at least one bracket secured to a position in the nacelle and a belt pulley of said at least one auxiliary device. Hereby a reliable and simple movement transfer from the auxiliary device to the one or more shafts is established. The auxiliary device with the bracket is preferably positioned just above the one or more shafts, e.g. at the frame of the rotating means, allowing the length of the belt to be as small as possible.

In another embodiment, the gear and/or the generator belt pulleys have different sizes in relation to belt pulley of said at least one auxiliary device e.g. being significantly larger in diameter. By the difference in pulley size a gearing between the auxiliary device and the shaft is achieved, ensuring that an advantageous relation in turning speeds of the two may be chosen.

In another embodiment, said connection means is a cardan coupling system flexibly connecting the high-speed shaft ends of the gear and/or the generator with said at least one auxiliary device. With the use of a cardan coupling, a multifaceted movement transfer is possible e.g. with the movement of the gear and generator with one auxiliary device. Further, the positioning of the auxiliary device is less restricted with a cardan coupling compared to a belt arrangement.

In a further embodiment, said cardan shaft system includes gearing means in the connection between the shafts and said at least one auxiliary device. With the gearing an advantageous relation in turning speeds of the auxiliary device and the shaft may be chosen.

In a further embodiment, the rotation means is mounted on the nacelle with flexible rubber bushings. The rubber bushings may preferably be introduced between the rotating means, such as the gear or generator, and the nacelle floor and thus reduce the transfer of vibrations to the gear or generator. With the reduction of vibrations the necessary movement of the rotating means may also be reduced, allowing the size of the auxiliary device including power supply to be diminished e.g. allowing a smaller model or type of an auxiliary device to be chosen.

The invention also relates to an auxiliary device for moving the rotating means of a wind turbine during transportation or stand still of said wind turbine, said device comprising securing means for securing the auxiliary device to a fixed position in relation to said rotating means, connection means for connecting the auxiliary device to the rotating means converting means for converting an internal or external energy source to mechanical force, and means for continuously or discontinuously transferring the mechanical force to the rotating means through said connection to the rotating means.

Hereby it is possible to protect the rotating means from potential damage during transportation or stand still. The potential lifetime of the rotating means may thus be significantly improved.

The invention also relates to a control and monitoring system for controlling the moving of the rotating means of a wind turbine with at least one auxiliary device during transportation or stand still, said system comprising
input signals from one or more sensors,
at least one time signal generator, and
one or more algorithms
where said at least one auxiliary device is controlled with output signals from said one or more algorithms in order to move the rotating means of the wind turbine during transportation or stand still, said output signal being derived from said input signals.

Hereby it is possible to monitor, improve and optimise the functionality of the auxiliary device and the moving of the rotating means of a wind turbine e.g. in relation to the power supply.

Lastly the invention relates to the use of an auxiliary device and/or control and monitoring system as a unit for supplementary connection to one or more shafts of rotating means in a wind turbine at transportation or other types of stand still.

With the supplementary connection it is possible to use the auxiliary device as a device connected with the rotating means when needed and remove it when not needed. The auxiliary device is thus an extra unit supplementary connected to the existing means of a wind turbine such as the rotating means of a wind turbine nacelle.

BRIEF DESCRIPTION OF THE DRAWINGS

The invention will be described in the following with reference to the figures in which.

DETAILED DESCRIPTION OF THE INVENTION

Figure 1:
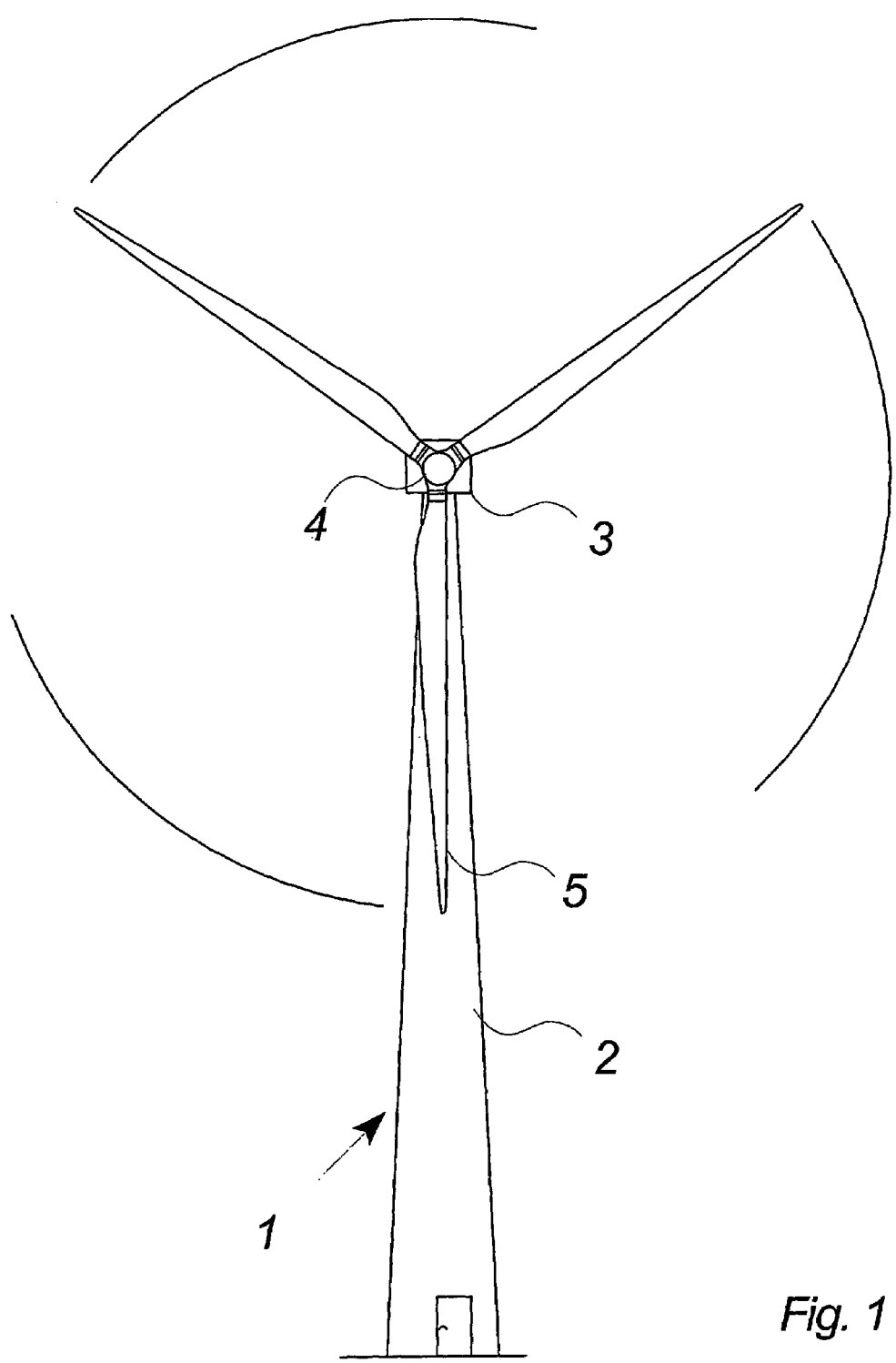
FIG. 1 illustrates a large modem wind turbine.

FIG. 1 illustrates a modern wind turbine 1 with a tower 2 and a wind turbine nacelle 3 positioned on top of the tower. The wind turbine rotor 5, comprising three wind turbine blades, is connected to the nacelle through the low speed shaft which extends out of the nacelle front.

As illustrated in the figure, wind beyond a certain level will activate the rotor due to the lift induced on the blades and allow it to rotate in a perpendicular direction to the wind. The rotation movement is converted to electric power, which is usually supplied to the transmission grid as known by skilled persons within the area.

Figure 2:
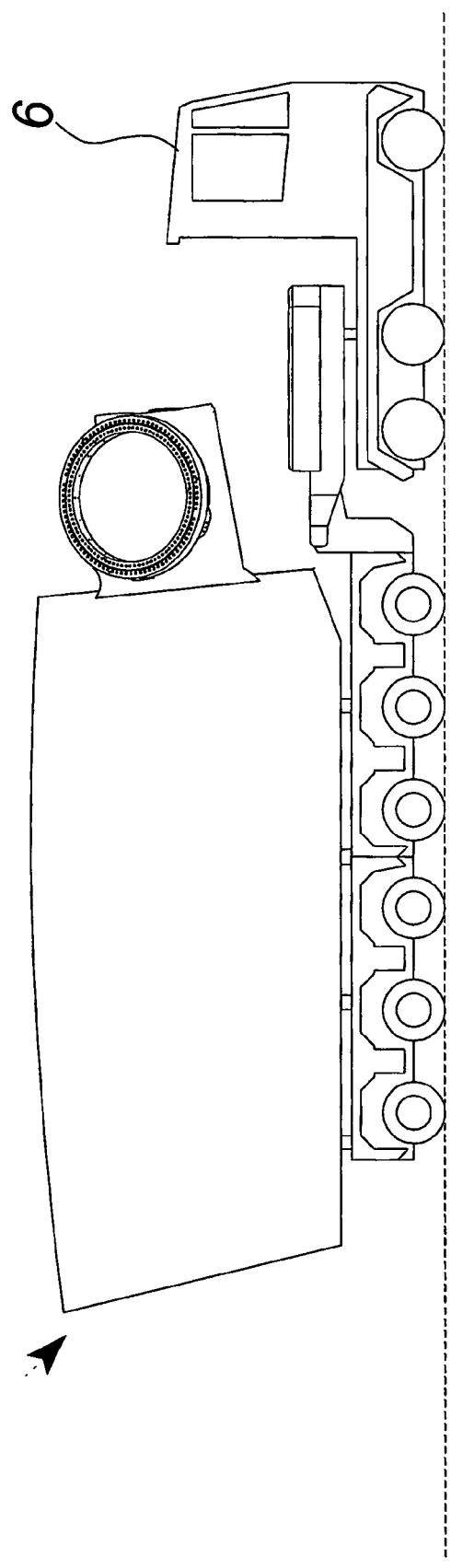
FIG. 2 illustrates a transportation situation of a nacelle.

FIG. 2 illustrates a common used method of transporting a wind turbine nacelle 3 from a production plant to a place of erection for a wind turbine.

The truck 6 is loaded with the nacelle at the production plant and at the erection place a crane lifts the nacelle and positions it on top of the previously erected tower.

The truck transportation can be the end of a long nacelle transportation that also may involve train and/or ship voyages as well as one or more intermediate positions of storage.

The transportation of the nacelle may also end with a ship voyage to an offshore erection place in which the nacelle is lifted to the tower top from the ship storage facilities.

Other transportation means for the nacelle is also possible such as air transportation but less practical e.g. due to transportation costs.

Beside transportation of nacelles to the erection places for the wind turbine, transportation may also be of components in the nacelle e.g. to the production plant of wind turbines. Examples of components may be the gear and generators being transported to the production plant with transportation means.

During transportation every component is integrated in a transportation frame construction ensuring a secure connection to the transportation means and protecting the component e.g. against rough weather conditions and the like.

During transportation of the components, in the nacelle or alone, the different components face vibrations and a continuous down force.

Figure 3A:
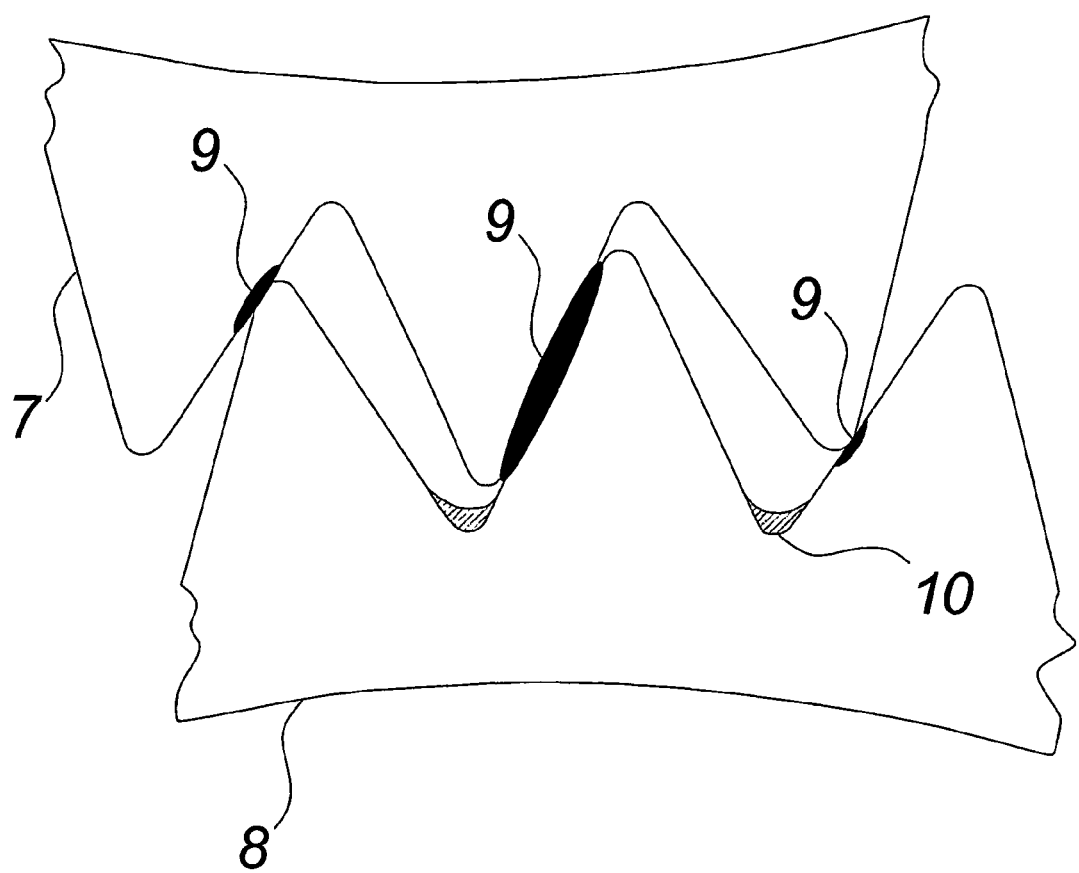
FIG. 3a illustrates a section of a toothed wheel in a gear.

FIG. 3a illustrates a section of a toothed wheel in a gear in which the consequences of vibrations and a continuous down force at the same position is illustrated.

The first toothed wheel 7 is forced against the second toothed wheel 8 at few positions during the stand still. At the positions are generated stand still marks 9 in the toothed wheels. Further, it is illustrated how the oil film 10 is collected at the lower positions.

Figure 3B:
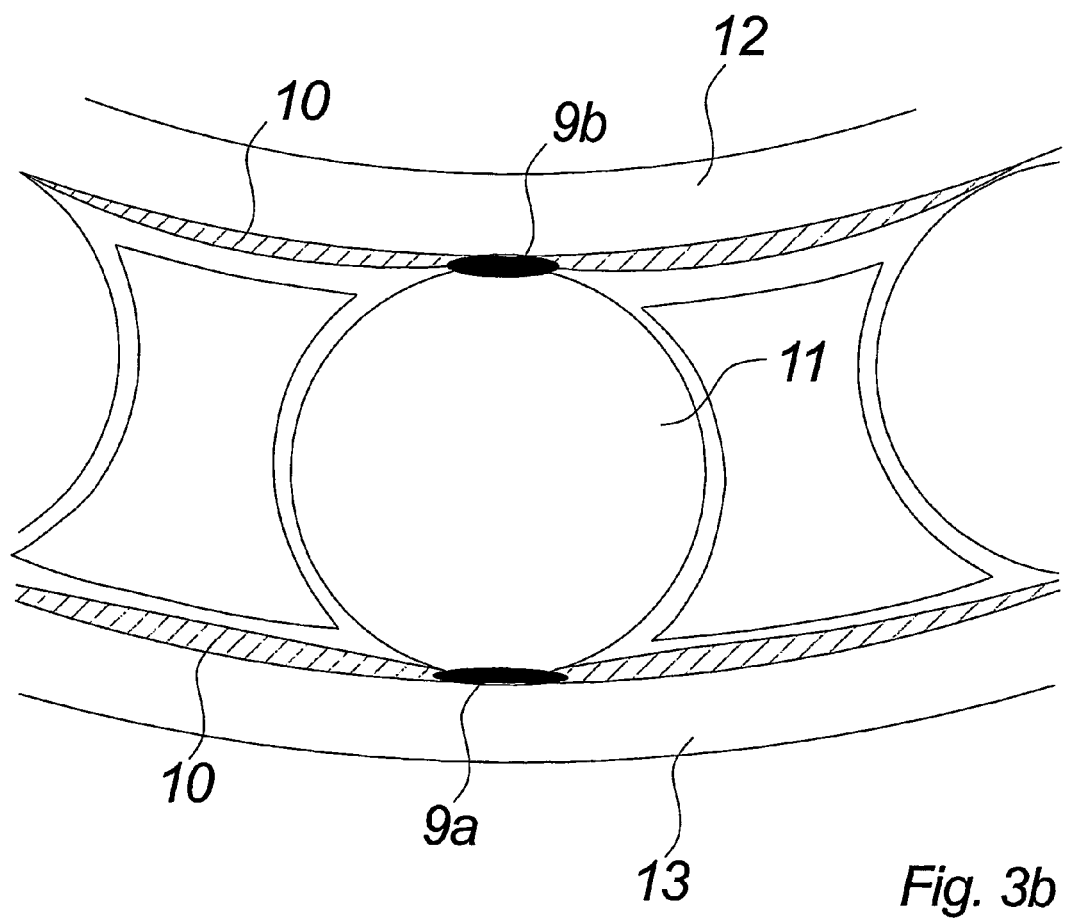
FIG. 3b illustrates a section of a bearing e.g. in a gear or generator.

FIG. 3b illustrates a section of a bearing e.g. in a gear in which the consequences of vibrations and a continuous down force at the same position is illustrated.

The inner ring of the bearing 12 is forced against the bearing roller 11 which again is forced against the outer ring 13 making stand still marks 9a, 9b in the rings and the roller as the oil film 10 is forced away.

Further, the stand still marks 9b may occur solely due to vibrations of the bearing roller 11 which little by little deteriorating the oil film.

Figure 4:
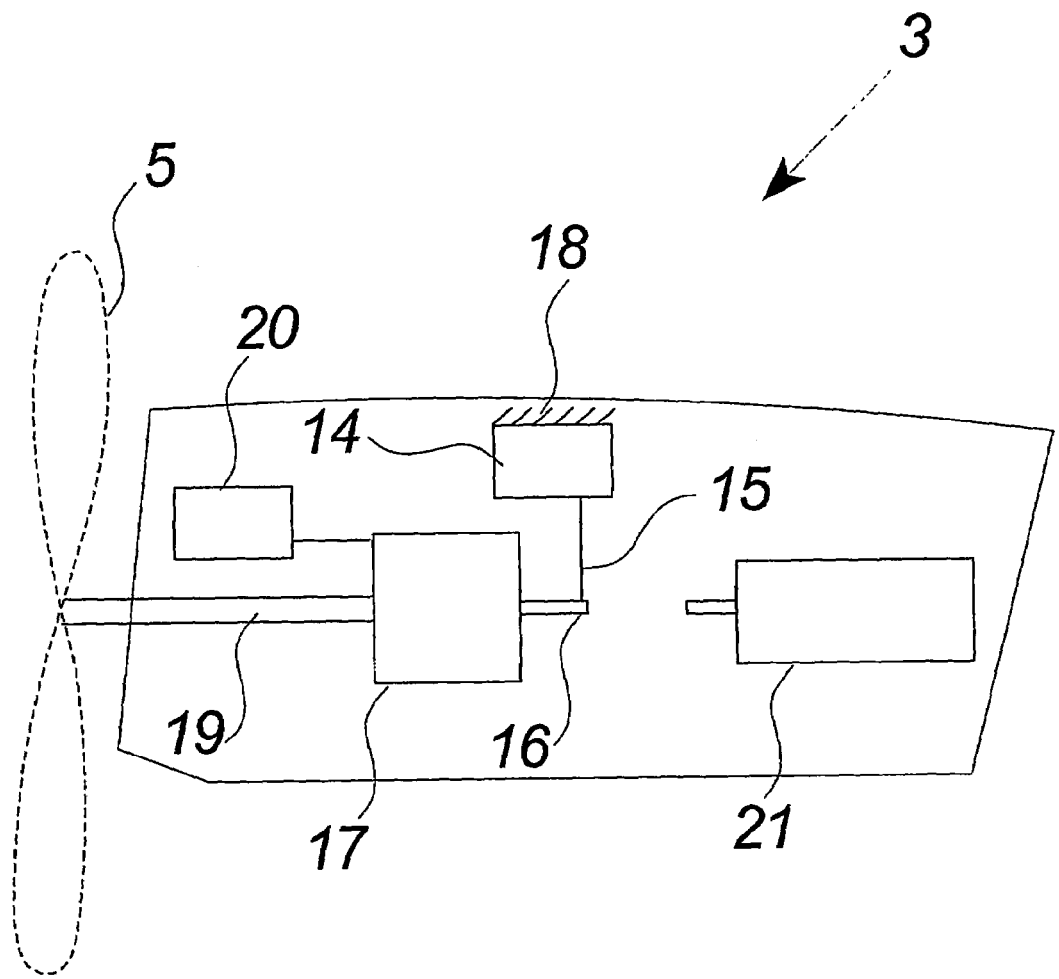
FIG. 4 illustrates schematically a first embodiment of a nacelle according to the invention during transportation.

FIG. 4 illustrates schematically a first embodiment of a nacelle according to the invention and during transportation.

The nacelle comprises a number of components including the gear 17 connected to the low speed shaft 19 at one end and the high-speed shaft 16 at another. Further, it is illustrated that the high-speed shaft is ready for the normal use connection to the electric generators 21.

The gear 17 also comprises a connection to an oil lubrication system 20, supplying oil lubrication in the gear. The lubrication system may be a splashed or forced lubrication system. Further, the system may be a combination of the two types of lubrication systems. The oil lubrication system also, comprises necessary components such as lubrication reservoirs, oil heater and cooler, one or more pumps and oil filters.

The supplied oil creates an oil film at the contact surfaces of the gear during normal rotating use and protects and separates the metal surfaces from each other.

The oil lubrication system preferably comprises an electric pump capable of pumping the oil into the gear. The electric pump may be powered from the auxiliary device during transportation or from its own electric power supply such as electric accumulators.

Further, the pump may in another embodiment be driven by a mechanical force instead of an electric power supply.

During normal use the electric pump may be a part of the oil lubrication system facilitating the oil pumping alone or together with one or more other pumps.

Further, the electric pump may be solely for transportation use, allowing the pump to be adapted to the special conditions of transportation including the possibility of a limited power supply.

The frame of the auxiliary device 14 is directly or indirectly fixed to the nacelle, e.g. with securing means 18, and the drive shaft of the device is connected to the high-speed shaft 16 at the gear 17 through a connection 15.

The connection 15 may be any type of connection allowing transmission of force from the auxiliary device 14 to the shaft e.g. a belt or chain connection.

Figure 5:
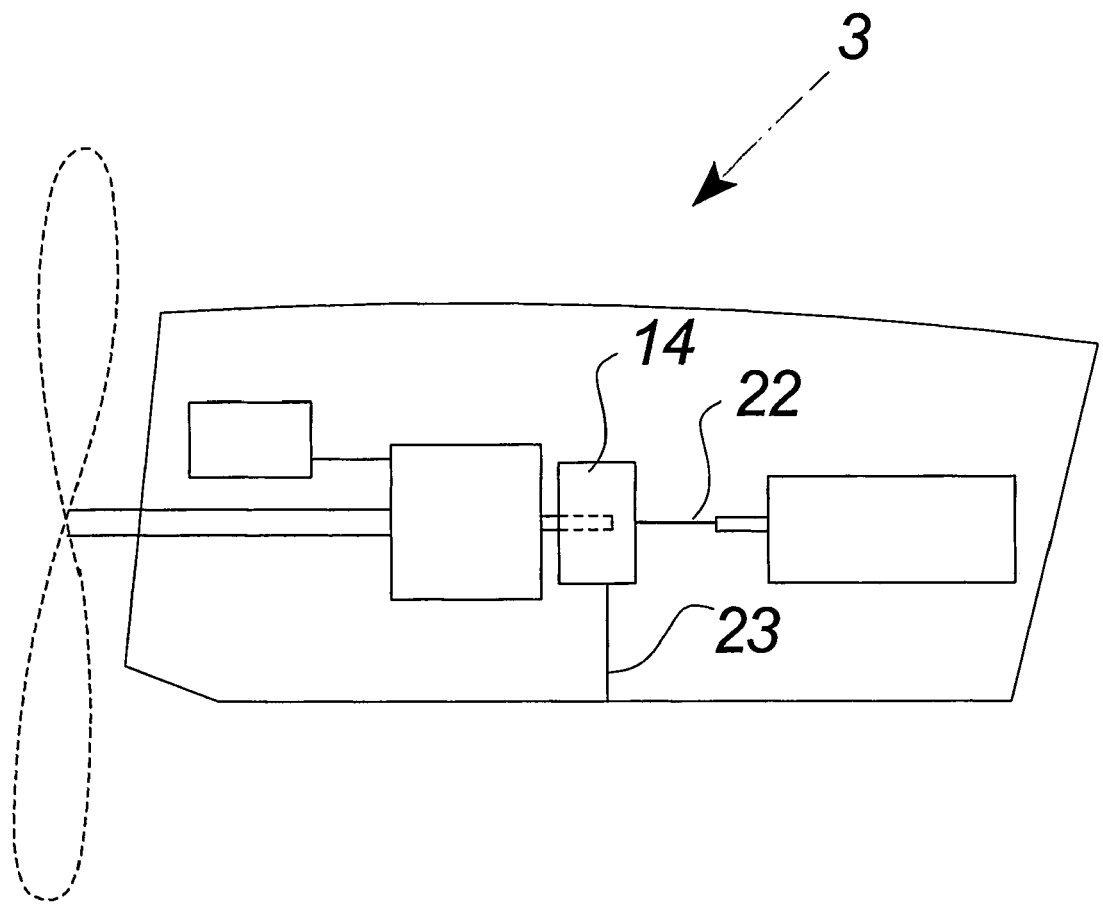
FIG. 5 illustrates schematically a second embodiment of a nacelle according to the invention during transportation.

FIG. 5 illustrates schematically a second embodiment of a nacelle according to the invention and during transportation.

The embodiment includes an auxiliary device 14 mounted directly to or on the high-speed shaft of the gear.

The auxiliary device 14 further comprises a direct or indirect connection to the interior of the nacelle 3 in order to fixate the auxiliary device to the nacelle at the rotation of the shaft. The connection may be achieved e.g. by a furnishing fixating the frame of the auxiliary device to the frame of the gear or the inner surface of the nacelle.

In general the auxiliary device is to be seen as a separate and compact unit that is positioned in the nacelle and connected to the high-speed shaft and oil pump at the voyage start. After the arrival at erection place the auxiliary device is removed from the nacelle in order to be used again at other nacelle transportations.

However, the auxiliary device or parts of the device may also be an integrated part of the nacelle used only during transportation or situations in which the gear of the nacelle is not moved for a considerable period of time.

The actuation may be a continuous actuation of the high-speed shaft or an actuation in which the force is released discontinuously.

The high-speed shaft is actuated due to the higher gearing compared with the low speed shaft making it easier to move the high-speed shaft.

The auxiliary device may be chosen among a number of system solutions such as:

a) a motor that is supplied with electric power from an internal or external electric power source in relation to the nacelle.

The electric power may preferably also supply the electric pump capable of pumping oil into the gear.

b) an engine that uses a variety of non electrical fuels such as diesel, gasoline or other fossil fuels. Further, the motor may be fuelled by a chemical conversion involving hydrogen, oxygen or similar highly active fluids. The different fuels may be supplied from internal or external storages in compressed or not compressed form.

The fumes from the combustion of fossil fuels are guided in tubes to an exterior opening in the nacelle or further away if necessary.

The motor may also drive an electric generator in order to supply both mechanical and electric power. In an embodiment the motor and generator combination can be a standard diesel or gasoline generator which will be familiar to the skilled person.

Further, the motor and generator combination may in a preferred embodiment be used solely to supply electric power e.g. to an electric motor as described in a). In this embodiment the motor and generator combination may be positioned outside the nacelle with a cable connection to the electric motor positioned in proximity of the high-speed shaft.

c) a mechanical energy generator. The generator may involve a number of different solutions such as helical or leaf springs or torsion bars. The springs or torsion bars are compressed or in other ways tensioned at the voyage start in order to establish enough force to perform a controlled mechanical actuation of the high-speed shaft.

The mechanical energy generators may be combined with electric power supplied from electric accumulators, solar cells or the like e.g. in order to drive the electric pump. The pump may however also be driven by mechanical force supplied from the mechanical energy generators instead of using electric power.

d) other examples of mechanical energy generators. The generators may involve pneumatic or hydraulic systems supplied with compressed air or hydraulic oil, respectively.

The mechanical energy generators may be combined with a separate electric power supply as described above or drive their own electric generator in order to generate electric power.

The above mentioned energy sources are examples of internal (positioned inside the nacelle or a transportation frame) or external (positioned outside the nacelle or a transportation frame and supplied to the nacelle or a transportation frame) energy sources. The energy of the energy sources are converted by converting means to mechanical force in which the force is transferred e.g. to the rotating means. The converting means may e.g. be seen as motors, engines etc. as described above and below.

Combinations of the abovementioned system solutions are also possible e.g. in order to establish a redundant energy system in case of failure, low power or power loss of the primary energy system. The redundant energy system may comprise electric accumulators, pneumatic or hydraulic storages, and solar cells such as movable carpets of solar cells.

The auxiliary device of a) may preferably be supplied with electric power via a connection to the energy systems of the transportation means e.g. the electric generator of a truck, train or ship. The transportation means may comprise specialized facilities at the nacelle proximity such as electricity distribution boxes in order to facilitate an easy connection between the energy systems and the nacelle.

The hydraulic system of d) may preferably be supplied from the hydraulic pump system of the transporting truck, train or ship. The necessary compressed air may be supplied from the truck, train or ship or from one or more container tanks in or outside the nacelle e.g. next to the electric accumulators if accumulators are being used by the systems.

The solar cells may preferably be positioned on one or more of the upper surfaces of the nacelle or as separate, movable carpets.

The auxiliary device preferably comprises a control and monitoring system which manages the auxiliary device during the transportation.

The control and monitoring system may control the auxiliary device to move the high-speed shaft and the oil pump continuously or discontinuously by using an algorithm comprising different input parameters such as shaft turning speed, vibrations, oil film condition and energy levels. Further, different temperature and pressure inputs such as outside air temperature, temperature in the nacelle, the gear and generator bearing temperature, oil temperature and oil pressure may be obtained and used in controlling the auxiliary device optimally.

The oil pump may be synchronized with the normal working periods of the auxiliary device and thus create a lubrication supply when the gear and/or generator is moved but the pump may also work partly independently of the movement e.g. periodically forcing oil in between the toothed wheels of the gear while they are not moving.

The turning speed of the gear and generator is preferably very low such as a few degrees every day e.g. between 1 and 20 degrees resulting in less than a full rotation every week which is sufficient enough to avoid oil film rupture and stand still marks in the toothed wheels, bearings and the like. If the power supply to the auxiliary device is relatively unlimited a higher rotation speed may be chosen e.g. if the transport road is rugged as will be explained below.

Especially if the turning of the gear and/or generator is performed as a discontinuous and stepped function it is important that the control and monitoring system knows the position of the high-speed shaft in order to avoid long time vibration and weight exposure at the given position. Further, by knowing the exposure position and the period of exposure time it is possible to reduce the future exposure at the position as well as decide the next time to supply oil into the gear and generator.

In a preferred embodiment of the invention the control and monitoring system controls the auxiliary device and the gear and generator discontinuously with a full turn of the gear and generator during one month. The auxiliary device moves the high-speed shaft of the gear and generator during one minute every three hours. The resulting movement every day is thus 12 degrees at a 30 day month and 1.5 degree during the one minute movement.

The nacelle will naturally endure vibrations during the transportation in which some will be more severe than others. The control system and the algorithm may thus comprise thresholds defining the size of vibration shocks that should trigger an unscheduled acceleration or activation of the auxiliary device and the movement process.

The oil film condition may also be controlled by the control and monitoring system e.g. by calculating the time period since the last oil supply with reservations for unscheduled acceleration or activation or the like.

Further, the pressure in the oil lubrication system may be monitored in order to detect any pressure loss e.g. loss due to cracks or holes in the oil pipes. The pressure may be monitored between one or more preset threshold pressure values by pressure sensors.

The energy levels of the energy storage or storages may be monitored in relation to preset information regarding the transportation time in order to secure a continuous or discontinuous turning of the gear throughout the whole transportation.

If the energy level falls to a level indicating that there will not be sufficient energy to the whole transportation, the turning speed may be lowered or converted from a continuous to a discontinuous drive in order to preserve the remaining energy.

Further, any redundant energy storage may be utilised e.g. electric accumulators as explained above.

The control system may comprise data storage means that stores monitored information regarding the transportation.

If the control system detects one or more fail situations that may be harmful for the different rotation means of the nacelle, the control system may transmit alarm signals to the person responsible for transportation e.g. the driver of the truck or the captain of the ship. Further, the signal may be transmitted to a remote control center e.g. the production plant.

The signals may preferably be a wireless signal that identifies the nacelle, the problem and preferably the position of the nacelle e.g. with the use of mobile telephone systems together with GPS systems or satellite based maritime communication systems.

Figure 6:
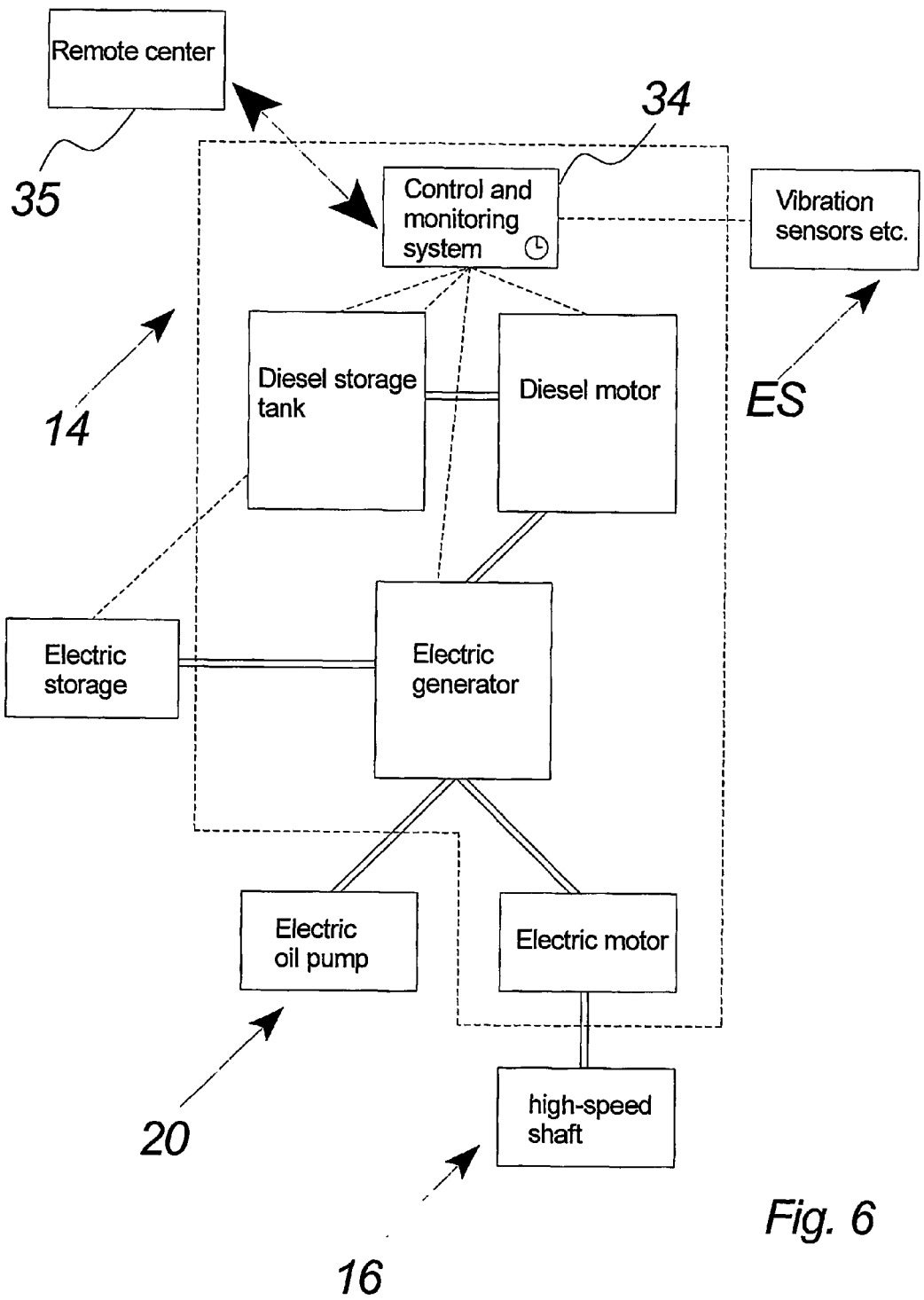
FIG. 6 illustrates a block diagram of a preferred embodiment of the auxiliary device.

FIG. 6 illustrates a block diagram of a preferred embodiment of the auxiliary device and the connected means.

The block diagram shows the components of a preferred embodiment of the auxiliary device 14 together with the direct connected means such as the high-speed shaft 16 and the electric oil pump 20.

The auxiliary device includes a diesel machine with a diesel motor connected with and driving an electric generator as well as the high-speed shaft of the gear through its diesel motor shaft.

The diesel machine is supplied with diesel from a diesel storage tank and may discharge exhaust gas through an opening in the nacelle to the exterior.

The electric generator supplies the electric oil pump with the necessary electric power. Further, the generator may supply an electric storage such as a number of electric accumulators, The accumulators may comprise a connection to the electric oil pump allowing the pump to be supplied with electric power without the diesel machine needs to be started.

Some or all the components in the auxiliary device 14 are controlled and monitored from the control and monitoring system including clock means.

Figure 7:
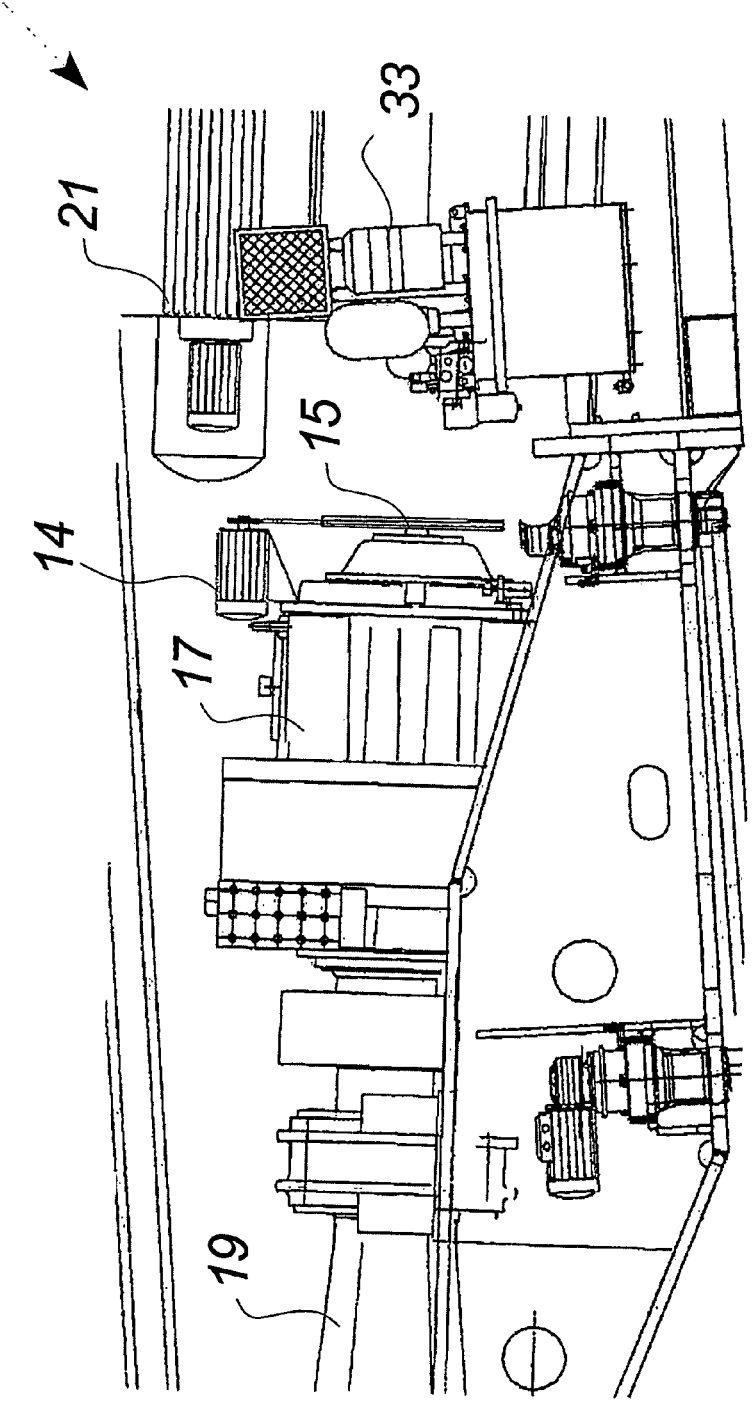
FIG. 7 illustrates a nacelle including an auxiliary device according to a preferred embodiment of the invention.

As described above the control and monitoring system comprises a number of internal and external sensors monitoring the status of the different components of the auxiliary device and the external components connected to the auxiliary device. Further, the control and monitoring system may comprise a number of external sensors monitoring conditions FIG. 7 illustrates a nacelle including an auxiliary device according to a preferred embodiment of the invention.

The figure shows the auxiliary device 14 in the form of an electric motor connected to a diesel generator system as described in connection with the block diagram of the previous figure.

The electric motor is steadily positioned at the top of the framework of the gear 17. Further, the shaft of the electric motor is connected with a connection 15 to the high-speed shaft of the gear. The connection is a belt connecting a belt pulley of the motor shaft to a belt pulley of the gear.

The figure also illustrates other nacelle components such as the hydraulic system 33 for pitching the wind turbine blades, the low speed shaft 19 and the electric generator 21.

The high speed shaft is usually separated in two shaft ends before normal use of the wind turbine, said ends extending from the gear and the generator, respectively. At the erection of the wind turbine the shaft ends are flanged together.

The present embodiment may temporarily connect the shaft ends in order to move both shaft ends, separately connect the auxiliary device(s) to each high-speed shaft end or just move one of the shaft ends e.g. the shaft end of the gear.

In order to reduce the transfer of vibration to the different components of the nacelle, the components such as the gear and generator may be mounted on the nacelle with flexible rubber bushings.

Figure 8:
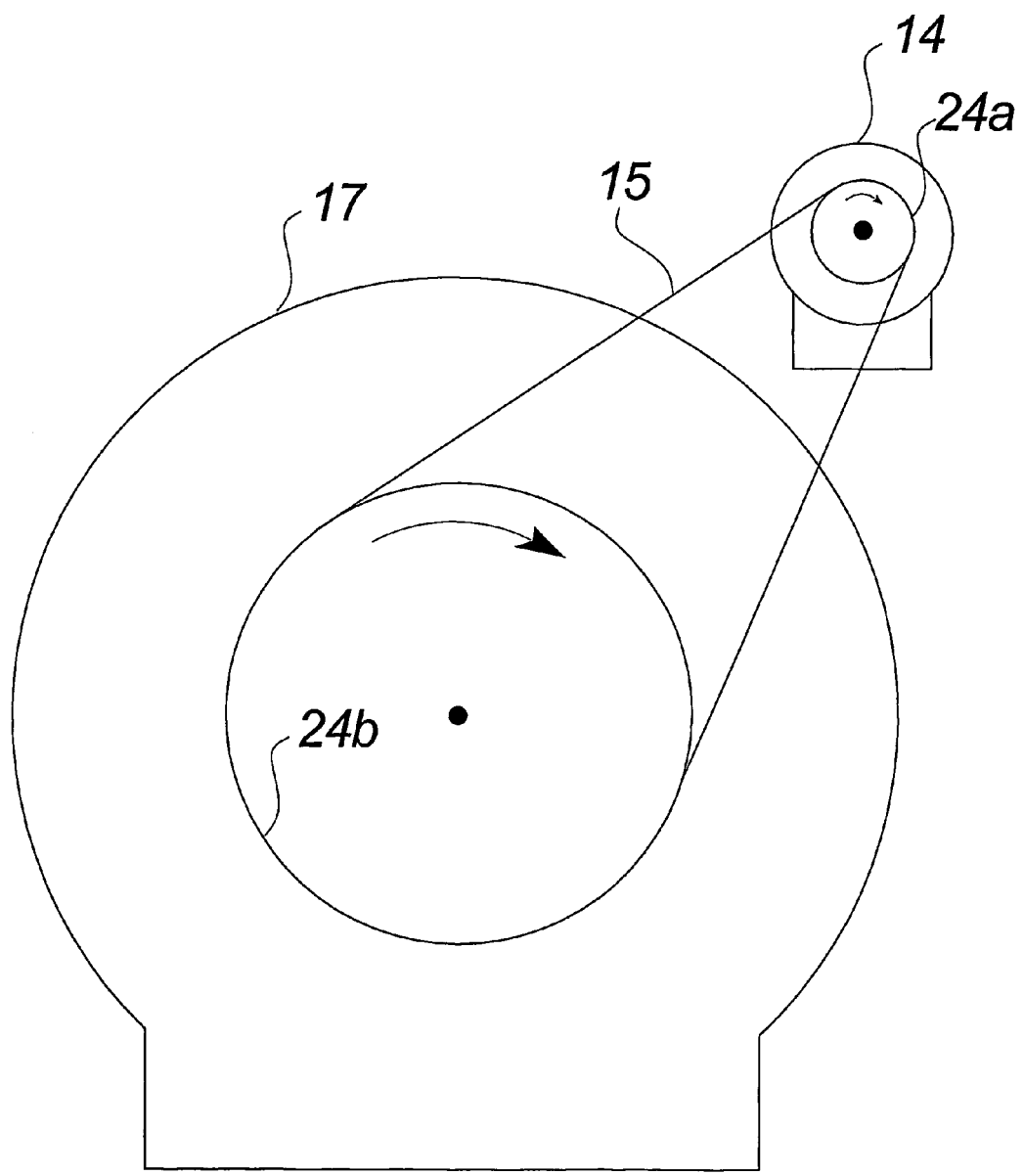
FIG. 8 illustrates the transmission of movement to the high-speed shaft at the gear according to a preferred embodiment of the invention.

FIG. 8 illustrates the connection 15 of FIG. 7 in more details, including the transmission of movement to the high-speed shaft at the gear.

The connection 15 between the auxiliary device 14 and the high-speed shaft at the gear is achieved with a belt. The moment of force applied to the high-speed shaft is enhanced with a transmission between the small belt pulley 24a at the auxiliary device and a large belt pulley 24b at the shaft.

It shall be emphasized that the belt system may easily be modified to move both the gear and the generator.

Figure 9:
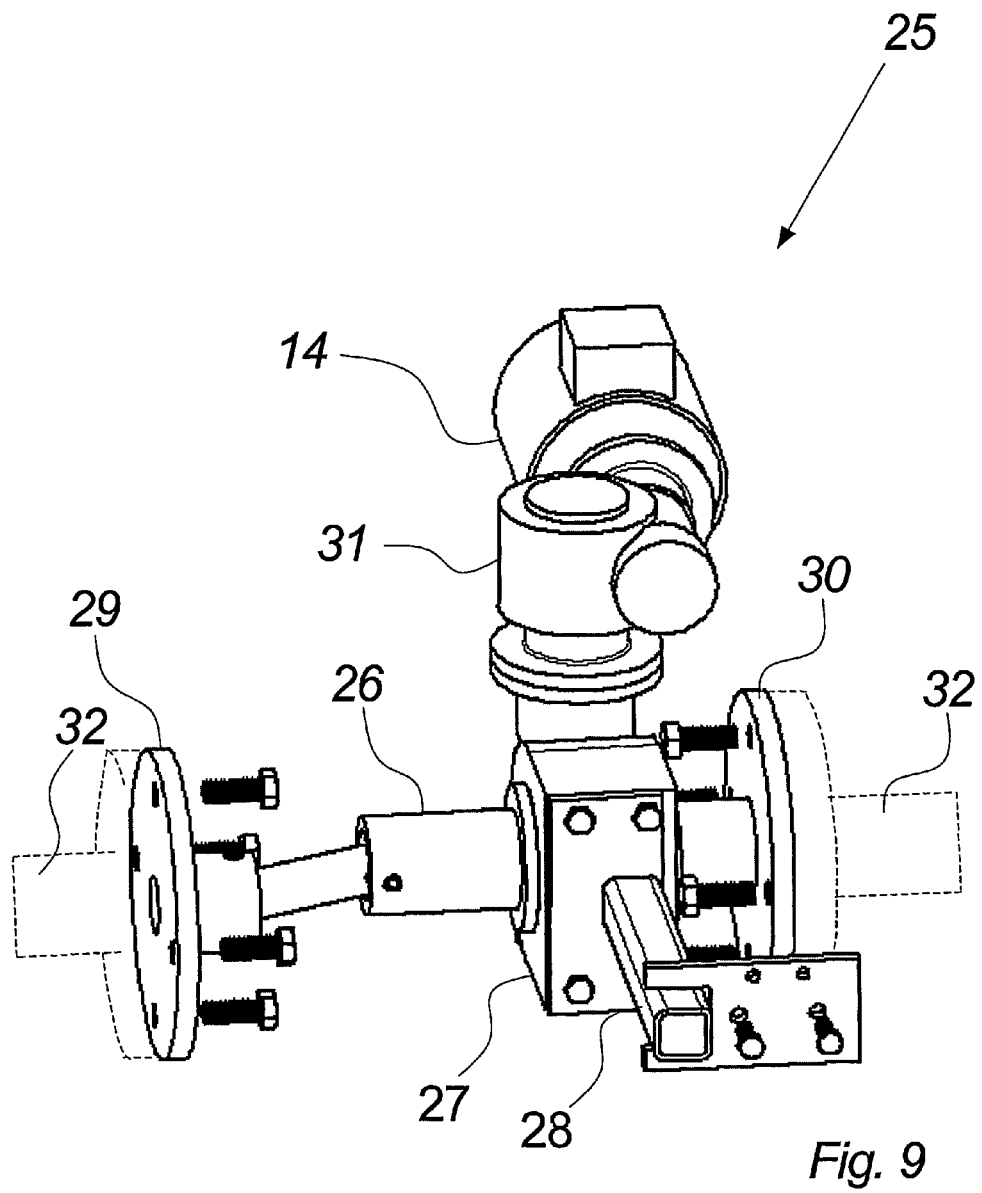
FIG. 9 illustrates a further preferred embodiment of a nacelle including an auxiliary device.

FIG. 9 illustrates a further embodiment of connection means between an auxiliary device and the rotating means of a nacelle.

The rotating means being the high-speed shaft ends 32 of the gear and generator and the connection means including a cardan coupling system 25, temporarily connecting the gear and generator during the transportation in a flexible manner.

The cardan shaft system includes a gear and generator flange bushing 29, 30 ensuring the connection of the cardan coupling system to the high-speed shafts. From the gear flange bushing 29 a cardan shaft 26 extends that ends in gearing means 27. The gearing means is also connected with a shaft to the generator flange bushing 30 and through transmission means 31 to the auxiliary device 14. In order to fixate the gearing means in relation to the nacelle the gearing means further comprises securing means 28, said securing means preferably being a metal tube or bar engaging with a plate secured to the nacelle.

The auxiliary device may preferably in the embodiment be an electric motor transferring force through the transmission and gearing means to the shafts of the nacelle gear and generator.

It shall be emphasized that the cardan shaft system may easily be modified to move just the gear or just the generator.

As mentioned above the auxiliary device may also be used in connection with long periods of stand still for the rotation means of a wind turbine beside the period of transportation. Examples of stand still periods may be longer periods of storage in storage facilities. The auxiliary device may receive its power from a separate power supply such as the public electricity grid.

The invention has been exemplified above with reference to specific examples. However, it should be understood that the invention is not limited to the particular examples described above but may be used in connection with a wide variety of applications. Further, it should be understood that especially the auxiliary device according to the invention may be designed in a multitude of varieties within the scope of the invention as specified in the claims.

The invention claimed is:

1. Method of moving the rotating means of a wind turbine during transportation, said method comprising the steps of:
   securing at least one auxiliary device to a fixed position in relation to said rotating means of the wind turbine, the rotating means comprising one or more shafts,
   connecting said at least one auxiliary device to the rotating means during transportation, said least one auxiliary device being able to store, generate and/or convert energy during transportation,
   transferring energy from said at least one auxiliary device to said one or more shafts of the rotating means during transportation, and
   moving said one or more shafts of the rotating means continuously or discontinuously from a position to another.

2. Method of moving the rotating means according to claim 1, wherein said rotating means is included in a nacelle of a wind turbine or in a transportation frame construction.

3. Method of moving the rotating means according to claim 1, wherein said auxiliary device is connected to a high-speed shaft at a gear and/or a generator.

4. Method of moving the rotating means according to claim 1, wherein said one or more shafts are turned at a very low turning speed comprising less than one full turn per week.

5. Method of moving the rotating means according to claim 1, wherein the moving of said rotating means is discontinuous comprising between 30 seconds and 20 minutes of movement every period.

6. Method of moving the rotating means according to claim 1, wherein the moving of said one or more shafts of the rotating means is combined with oil lubrication at said rotating means.

7. Method of moving the rotating means according to claim 1, wherein said method activates or controls one or more oil lubrication pumps supplying lubrication to said rotation means.

8. Method of moving the rotating means according to claim 7, wherein said auxiliary device and/or said one or more oil lubrication pumps is activated or controlled continuous or discontinuously.

9. Method of moving the rotating means according to claim 1, wherein said transportation is performed with transportation means comprising trucks, trains or ships.

10. Method of moving the rotating means according to claim 1, wherein said auxiliary device is connected to one or more energy generating systems of said transportation means comprising the electric generators, pneumatic or hydraulic pumps.

11. Method of moving the rotating means according to claim 1, wherein said auxiliary device is connected to said rotating means before start of the transportation.

12. Method of moving the rotating means of a wind turbine during stand still during transportation, said method comprising the steps of:
   securing at least one auxiliary device to a fixed position in relation to said rotating means connecting said at least one auxiliary device to the rotating means of the wind turbine, the rotating means comprising one or more shafts, said auxiliary device being able to store, generate and/or convert energy during stand still during transportation,
   transferring energy from said at least one auxiliary device to said one or more shafts of the rotating means during stand still during transportation, and
   moving said one or more shafts of the rotating means continuously or discontinuously from a position to another.

13. Method of moving the rotating means according to claim 12, wherein said rotating means is included in a nacelle of a wind turbine or in a transportation frame construction.

14. Method of moving the rotating means according to claim 12, wherein the moving of said rotating means are turned at a very low turning speed comprising less than one full turn per week.

15. Method of moving the rotating means according to claim 12, wherein the moving of said rotating means is discontinuous comprising between 30 seconds and 20 minutes of movement every period.

16. Method of moving the rotating means according to claim 12, wherein said auxiliary device is connected to one or more separate energy generating systems.

17. Method of moving the rotating means according to claim 12, wherein said method activates or controls one or more oil lubrication pumps supplying lubrication to said rotation means.

18. Method of moving the rotating means according to claim 17, wherein said auxiliary device and/or said one or more oil lubrication pumps are activated or controlled continuous or discontinuously.

* * * * *